March 1, 1960

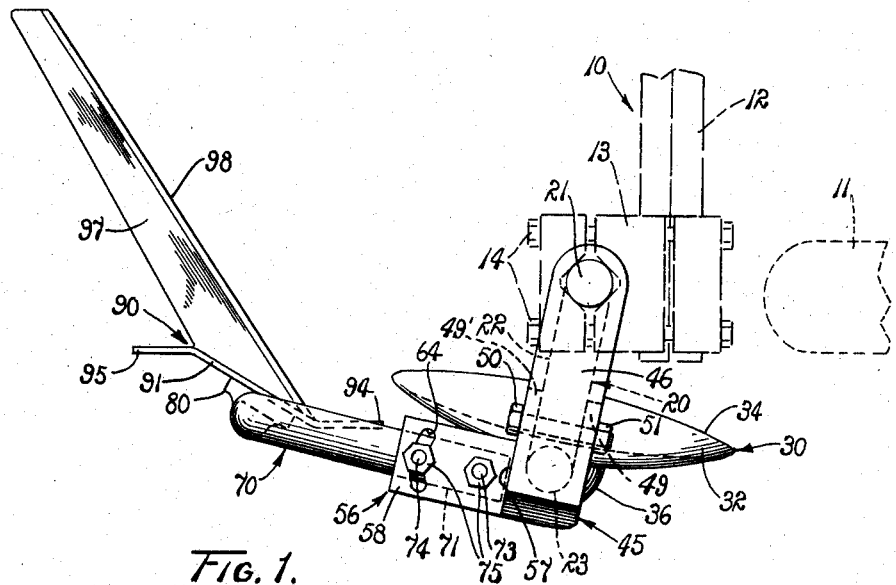

J. C. PEREIRA 2,926,733

DISK AND INTERCONNECTED WEED KNIFE

Filed Oct. 10, 1957

JOSEPH C. PEREIRA,
INVENTOR
HUEBNER, BEEHLER & WORREL
ATTORNEYS

United States Patent Office 2,926,733
Patented Mar. 1, 1960

2,926,733

DISK AND INTERCONNECTED WEED KNIFE

Joseph C. Pereira, Lemoore, Calif.

Application October 10, 1957, Serial No. 689,331

4 Claims. (Cl. 172—181)

The present invention relates to a tool connecting bracket and more particularly to a bracket for releasably rigidly interconnecting an earthworking disk and a weed knife for cooperative action.

It is well-known to employ a disk for cultivating purposes. A single disk, or more generally a gang of disks, is mounted in acute angular relation to the direction of travel of the implement to discharge encountered earth laterally and partially or completely to turn over the soil. Although disks are effective to uproot some weeds, they may not destroy deleterious growth simply by turning the soil over. In addition, a single blade works an inadequate swath and a multiplicity of blades are usually difficult to control under precise limitations encountered in certain row crops.

On the other hand, weed or beet knives are well-known for slicing through the ground and cutting off stalks or roots of weeds. A weed knife usually provides a vertical mounting shank and a horizontal blade extended from the shank slightly below the surface of the soil. Such knives are prone to collect trash, particularly on their shanks, which greatly impairs effective operation. Further, weed knives are frequently ineffective in hard soil, are inclined to snag row crops particularly if dragging trash therewith, and are known to slide over weeds and other debris which it is desired to destroy.

Effort has been made in the past to associate a disk and a blade for cooperative action. However, the known arrangements have included separate mounting frames for the disk and the blade so that there may be relative lateral or swaying movement of the blade with respect to the disk. Unless the blade is constrained to travel in precisely the same path as the disk, effective cooperative action is precluded. Even where attempt has been made for more rigid association, the interconnecting devices have not been sufficiently simple or adjustable to enable quick and easy assembly, disassembly, adjustment and/or replacement.

Accordingly, it is an object of the present invention to provide an improved tool connecting bracket.

Another object is releasably to interconnect a disk blade and a weed knife in predetermined fixed relation.

Another object is to mount a disk and a weed knife in such a manner that their actions in earth engagement complement each other.

Another object is to mount a disk and a weed knife so that the disk slices encountered soil and debris, loosens the soil in advance of, and minimizes trash collection on, a following weed knife.

Another object is to enable effective close cultivation of row crops, even at early stages of growth.

Other objects are to provide a tool connecting bracket which is of simple and economical construction, dependable in operation, durable in form and adapted to interconnect a variety of different implements.

These, together with other objects will become more fully apparent upon reference to the following description.

In the drawings:

Fig. 1 is a top plan view of a bracket embodying the principles of the present invention, a fragment of a tractor, a disk mounted on the tractor and having a shank supporting a bracket, and a weed knife including a shank borne by the bracket.

Fig. 2 is a side elevation of the apparatus shown in Fig. 1.

Figure 3:
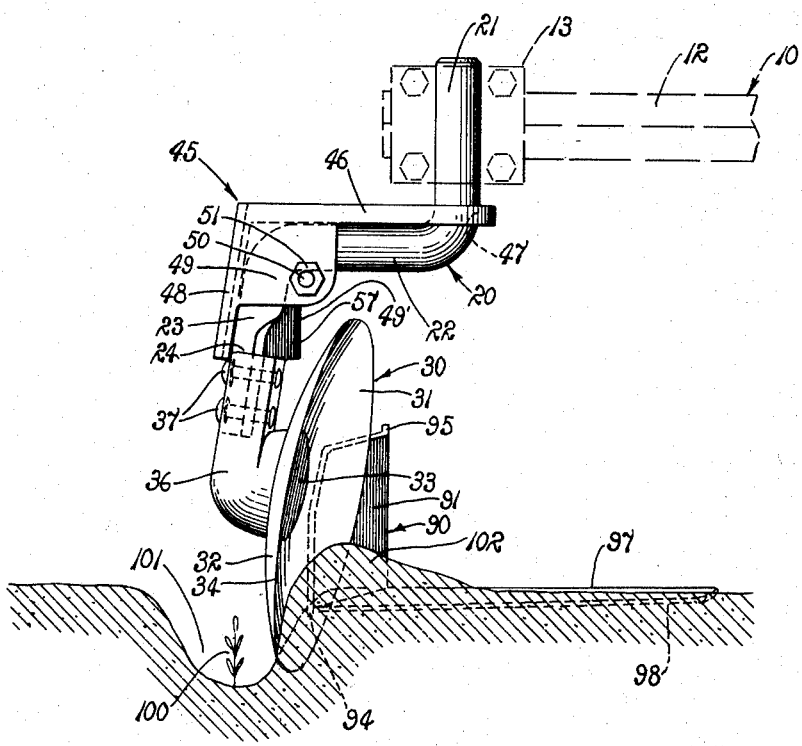
Fig. 3 is a front elevation of the apparatus illustrated in Fig. 1.

Referring more particularly to the drawings, a tractor is fragmentarily illustrated in Fig. 1 at 10. The tractor includes rear ground engaging wheels 11 for supporting the tractor for earth traversing movement in a predetermined forward line of travel. A tool beam 12 is mounted on the tractor and extended transversely of the line of travel. Further, a clamp 13 is provided on the tool beam and includes a pair of adjustable bolts 14 for tightening and loosening the clamp.

A substantially Z-shaped standard or main mounting member 20 provides an upper vertical end portion 21 releasably slidably fitted in the clamp 13 and adjustably rigidly mounted on the tool beam 12 in predetermined anguler position by means of the adjustable bolts 14. The standard also has an intermediate portion 22 integrally outwardly extended in substantially horizontal position from the upper end portion, and a lower portion 23 integrally downwardly extended in substantially vertical position from the upper end portion. It is to be noted that the standard is angularly adjusted in the clamp so that the intermediate portion extends outwardly and slightly rearwardly, as best seen in Fig. 1. It is preferable that the lower end portion of the standard be in slight obtuse angular relation with the intermediate portion, as best seen in Fig. 3. Further, the lower end portion is downwardly beveled at 23, as best seen in Fig. 3.

An earthworking disk 30 provides a concave surface 31, a convex surface 32, a hub 33, and a substantially circular cutting edge or rim 34 concentrically circumscribing the hub. A mounting post 36 rotatably mounts the hub of the disk thereon, by means of a journal axle, not shown, and extends upwardly into overlapping engagement with the lower end portion 23 of the standard 20. A pair of rivets 37 is extended through the overlapping post and standard to mount the disk on the standard. The disk is in generally parallel relationship to the lower end portion of the standard and thus is in slightly acute angular relationship with a vertical, as best seen in Fig. 3. Further, the plane of the disk is in slightly acute angular relationship with the line of travel of the tractor 10, as best seen in Fig. 1 in order to achieve its well-known trash and soil slicing effect.

A bracket 45 includes a top horizontal bar 46 overlaying the intermediate portion 23 of the standard 20 and providing an aperture 47 fitted over the upper end portion 21 of the standard. The top bar is substantially coextensive with the intermediate portion of the standard, and a connecting plate 48 is integrally downwardly angularly extended from the top bar in outwardly overlaying relationship to the lower end portion 23 of the standard. As best seen in Fig. 3, the angular relationship of the connecting plate and the top bar is substantially the same as that of the intermediate and lower end portions of the standard. Front and rear ears 49 and 49' are secured, as by welding, to the opposite sides of the top bar and connecting plate and extend on opposite sides of the intermediate and lower end portions of the standard in spaced parallel relation. It will be evident that the ears brace the juncture between the top plate and the connecting bar of the bracket. An elongated bolt 50 is extended through the ears on the opposite side of the standard from the bar and the plate, and a nut 51 is screw-threaded on the bolt.

The bracket 45 also includes an elongated channel portion 56 having a front end wall 57 constituting a lower portion of the rear ear 49', spaced parallel, substantially horizontal, upper and lower walls 58 and 59 rearwardly extended in elevationally spaced parallel relation from the ear. The upper and lower walls of the channel define a recess 61 opening laterally outwardly of the channel to both sides. The upper and lower walls provide vertically aligned forward openings 63 and vertically aligned kidney-shapde rear openings 64 concentric to the forward openings. It will thus be evident that the channel portion is extended rearwardly in substantially normal relation to the plate and bar and thus is in slightly acute angular relationship to the line of travel of the tractor, as best seen in Fig. 1.

An arcuate mounting shank 70 includes an upper horizontal section 71 providing vertical front and rear bores 72. The upper section of the shank is releasably fitted in the recess 61 of the channel portion 56 with the front and rear bores respectively in registration with the forward and rearward openings 63 and 64 in the channel portion. Elongated bolts 73 and 74 are upwardly extended through the registered openings and bores, and nuts 75 are screw-threaded on the bolts and against washers 76 interposed the nuts and the upper wall 58. It will be evident that the shank is mounted for lateral pivotal movement around the forward bolt 73 and that the shank may be adjustably fixed in predetermined angular position by loosening and tightening the nut on the rear bolt 74.

The mounting shank 70 also provides a downwardly extended lower vertical portion 80 which is flattened through substantially all of its length and provides a plurality of longitudinally extended, longitudinally spaced vertical slots 81. Because of the length of the upper shank section and its angular disposition, the lower shank section is located generally behind the disk 30 with respect to the forward direction of travel of the tractor 10.

A weed cutting knife 90 includes a vertical flange 91 fitted against the flattened lower section 80 of the mounting shank 70 and elevationally adjustably secured thereto by means of a plurality of bolts 92 having nuts 93 screw-threaded thereon. The flange has a lower aperture, not shown, in registration with the lower slot 81 and an upper arcuate aperture 91a in registration with the upper slot 81 and concentric to the lower aperture. The flange is in generally parallel relation to the disk and thus is acutely angularly related to the line of travel of the tractor. The knife has wings 94 and 95 forwardly and rearwardly extended therefrom in substantial alignment with the direction of travel of the tractor 10 and thus in angular relationship to the flange. The knife also provides a substantially horizontal cutting blade 97 rearwardly angularly extended from the flange 91 in the same direction as the concave surface 31 of the disk 30 faces and, of course, obliquely transversely of the line of travel of the tractor. The blade provides a sharpened knife edge 98 adapted for engagement with weeds, and the like, encountered during earth traversing movement.

*Operation*

The operation of the described embodiment of the subject invention is believed to be readily apparent and is briefly summarized at this point. In describing the operation of the invention, reference is conveniently made to a row of plants 100 located in a furrow 101 in the ground.

The tractor 10 is driven into the field and the bolts 14 adjusted to position the disk 30 laterally adjacent to the row of plants 100 but within the furrow 101. As has been noted, the disk is in slightly acute angular relation to the line of travel, as best seen in Fig. 1. The angularity of the blade 97 and the flange 91 is adjusted by loosening and tightening the nut 75 on the rear bolt 74. When adjusted, the weed cutting knife 90 is in fixed rearwardly spaced association with the earthworking disk 30. More specifically, the flange 91 is rigidly held directly behind the disk. Preferably, the wings 94 and 95 are in alignment with the direction of travel, as shown. However, the knife can be pivoted further inwardly toward the row (that is counterclockwise in Fig. 1) so that the flange 91 is substantially parallel to the direction of travel, or further outwardly (that is clockwise in Fig. 1) to increase the angularity of the flange relative to the line of travel. By adjusting the nut 93, the blade is tipped slightly forwardly so that the front wing is slightly downwardly directed into the ground. This is indicated in Fig. 2.

The tractor 10 is driven forwardly in a direction toward the right, as illustrated in Fig. 1. The disk 30 discharges encountered earth laterally outwardly relative to the furrow 101 into a hill 102 adjacent to the row. Because of the very slight angularity of the disk, however, very little dirt is discharged laterally. Primarily, it is to be noted that the disk slices through the ground and debris so that the following knife may operate effectively without becoming encumbered with trash.

The weed knife 90 operates slightly below the surface of the soil and slices through the stalks and roots of weeds growing in the soil. Inasmuch as the disk 30 preconditions the earth for flange 91, trash collection by the flange is minimized. Actually, the disk slices through such debris so that it merely slides rearwardly off from the flange. Further, since the ground in advance of the blade is loosened and a furrow provided by the disk, the forward wing 94 more easily penetrates the ground and the tendency of the knife to rise upwardly out of the ground is minimized. Thus the problem previously described of conventional weed knives sliding over, instead of cutting through, weeds, debris and hard soil is obviated.

The employment of the bracket 45 insures the above described action. The bracket rigidly interconnects the disk 30 and the knife 90 in the described association so that their individual functions complement each other. Notwithstanding this rigid association, the bracket is quickly and simply attached to the mounting standard 20 and shank 70, enables adjustment of the weed knife with respect to the disk in a simple and easy manner and precludes the usually objectionable lateral weaving of the knife relative to the disk which results when these tools are mounted independently of each other. Thus substantially all weeds in a predetermined path are destroyed. The bracket is economical to construct and use and provides durable means capable of withstanding the rugged use to which the cultivating apparauts is subjected. In practice it has been found excellently suited for use in shallow cultivation and particularly for accurate and effective action in row crops.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An apparatus for interconnecting a pair of earthworking tools comprising a substantially Z-shaped standard including an upper substantially vertical portion, a substantially horizontal intermediate portion integral with the upper portion, and a lower portion integrally downwardly extended from the intermediate portion and adapted to support a first tool; an attachment bracket having a top horizontal plate overlaying the intermediate portion of the standard and providing an aperture slidably fitted over the upper portion of the standard, a connecting plate secured to the top plate and angularly downwardly extended therefrom, ears secured to opposite side edges of the top and connecting plates in spaced parallel relation and extended on opposite sides of the juncture between the intermediate and lower portions of the standard, spaced substantially parallel upper and lower walls secured to the connecting plate and rearwardly horizontally extended therefrom, the upper and lower walls having longitudinally spaced, vertically aligned, forward and rearward openings, the rearward openings being arcuate and concentric to the forward openings, and a horizontal pin releasably extended through the ears under the standard; and an arcuate tool shank including an upper horizontal section releasably fitted between the upper and lower walls and a lower section integrally downwardly extended from the upper section adapted to support a second implement, the bracket further including a front substantially vertical pivot pin extended through the front openings in the walls and the shank, a rear substantially vertical bolt extended through the rear openings and the shank, and a nut screw-threaded on the bolt for adjustably pivotally securing the shank to the walls in predetermined rearwardly acutely angularly extended position in relation to the line of travel of the apparatus.

2. In an agricultural implement for cultivating soil adjacent to a row of growing crops, the combination of a substantially Z-shaped standard including an upper vertical portion adapted to be mounted for elevational adjustment on a support vehicle for earth traversing movement in a predetermined forward line of travel longitudinally of the row of crops and in laterally spaced relation thereto, a substantially horizontal intermediate portion integral with the upper portion and extended transversely of said line of travel inwardly toward such a row, and a lower portion integrally downwardly extended from the intermediate portion; an earthworking disk borne by the lower portion of the standard in substantially erect position acutely angularly related to said line of travel, the disk having a concave surface directed away from the row of crops and adapted to discharge encountered earth laterally away from the crops; an attachment bracket having a top horizontal plate overlaying the intermediate portion of the standard and providing an aperture fitted over the upper portion of the standard, a connecting plate secured to the top plate and angularly downwardly extended therefrom, ears secured to opposite side edges of the top and connecting plates in spaced parallel relation and extended on opposite sides of the juncture between the intermediate and lower portions of the standard, and a channel member secured to the connecting plate and rearwardly horizontally extended therefrom, the channel member having spaced upper and lower walls defining a laterally outwardly opening recess, the walls having longitudinally spaced, vertically aligned forward and rearward openings, the rearward openings being arcuate and concentric to the forward openings, and a horizontal pin releasably extended through the ears under the standard; an arcuate shank including an upper horizontal section releasably fitted in the recess of the channel member and a lower section integrally downwardly extended from the upper section, the bracket also including a front vertical pivot pin extended through the front openings in the channel member and the shank, a rear vertical bolt extended through the rear openings and the shank, and a nut screw-threaded on the bolt for adjustably securing the shank to the channel member in predetermined rearwardly acutely angularly extended position in relation to said line of travel; and a weed knife including an upright flange adjustably mounted on the lower section of the shank in rearwardly spaced generally parallel relation behind the disk, wings forwardly and rearwardly extended from the flange in substantial alignment with said line of travel, and a horizontal cutting blade rearwardly angularly extended from the flange in the same direction as the concave surface of the disk face and transversely of earth discharged by the disk whereby the disk loosens the earth and cuts through debris to facilitate passage of the flange therethrough and the blade severs weeds embedded in the earth.

3. A bracket for interconnecting Z-shaped and substantially straight tool mounting members, wherein the Z-shaped member provides a pair of opposite end portions interconnected by an intermediate portion, comprising a flat bar adapted to extend longitudinally against the intermediate portion of the Z-shaped member and providing an aperture adapted to receive one of said end portions; a plate integrally angularly extended from the bar in spaced relation to the aperture and adapted to extend longitudinally against the other end portion of the Z-shaped member, the plate and bar providing an inside angle therebetween substantially equal to the angle between the intermediate portion and the end portion of the Z-shaped member along which the plate is adapted to extend; ears extended from the bar and plate in spaced parallel relation and on opposite sides of the inside angle between the plate and the bar, the ears being adapted to extend on opposite sides of said Z-shaped member; a pin extended through the ears in spaced relation to the plate and bar substantially in a plane bisecting the inside angle between the plate and the bar and adapted to hold the Z-shaped tool mounting member between the ears, the plate, the bar and the pin; an elongated receiving member rigidly outwardly extended from one of the ears in angular relation to the ears and the bar and providing an opening adapted to receive the straight mounting member therein; and fastening means mounted on the receiving member for holding said straight mounting member in the opening.

4. In combination with a rigid Z-shaped mounting member having first and second opposite end portions interconnected by an intermediate portion, and a substantially straight rigid mounting member having angularly related opposite end portions; a bracket for releasably rigidly interconnecting the mounting members comprising a pair of rigid elongated portions interconnected in angular relation, meeting in an apex providing an inside angle and an outside angle greater than the inside angle, and respectively longitudinally extended outwardly against the intermediate and first end portions of the Z-shaped mounting member, the bracket portion against said intermediate portion having an aperture receiving said second end portion of the Z-shaped mounting member, spaced ears rigidly secured to the bracket portions adjacent to the apex therebetween and extended on opposite sides of said inside angle and on opposite sides of the Z-shaped mounting member, a pin extended through the ears on the opposite side of the Z-shaped mounting member from the bracket portions for releasably mounting the bracket on the Z-shaped mounting member, a pair of spaced parallel walls rigidly extended outwardly from one of the ears, said straight mounting member being releasably fitted between the walls, and a pin releasably extended through the walls and said straight mounting member for releasably rigidly mounting the straight mounting member on the bracket.

References Cited in the file of this patent

UNITED STATES PATENTS

| 1,197,173 | Baldwin | Sept. 5, 1916 |
| 2,260,752 | Casady | Mar. 26, 1918 |

FOREIGN PATENTS

| 266,435 | Italy | July 28, 1929 |